(12) United States Patent
Murison et al.

(10) Patent No.: US 7,724,787 B2
(45) Date of Patent: *May 25, 2010

(54) METHOD AND SYSTEM FOR TUNABLE PULSED LASER SOURCE

(75) Inventors: Richard Murison, St-Lazare (CA); Tullio Panarello, St-Lazare (CA); Benoit Reid, Laval (CA); Reynald Boula-Picard, Montreal (CA)

(73) Assignee: PyroPhotonics Lasers Inc., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/199,783

(22) Filed: Aug. 27, 2008

(65) Prior Publication Data

US 2009/0086773 A1    Apr. 2, 2009

Related U.S. Application Data

(63) Continuation-in-part of application No. 11/737,052, filed on Apr. 18, 2007, now Pat. No. 7,443,893.

(51) Int. Cl.
 *H01S 3/10* (2006.01)
 *H01S 3/30* (2006.01)
 *H01S 3/00* (2006.01)
 *G02F 1/03* (2006.01)

(52) U.S. Cl. .............................. 372/20; 372/6; 372/30; 359/264; 359/330

(58) Field of Classification Search .................... 372/6, 372/20; 359/237, 264, 333
See application file for complete search history.

(56) References Cited

U.S. PATENT DOCUMENTS

| 5,400,350 | A | 3/1995 | Galvanauskas |
| 5,745,284 | A | 4/1998 | Goldberg et al. |
| 6,148,011 | A | 11/2000 | Larose et al. |
| 6,621,619 | B2 * | 9/2003 | Strutz et al. ................. 359/334 |
| 7,110,168 | B2 | 9/2006 | Lee et al. |
| 7,113,327 | B2 * | 9/2006 | Gu et al. .................. 359/337.5 |
| 7,256,930 | B2 * | 8/2007 | Liu ......................... 359/337.1 |
| 7,440,162 | B2 * | 10/2008 | Gu et al. ..................... 359/333 |
| 7,443,893 | B2 | 10/2008 | Murison et al. |
| 7,457,329 | B2 * | 11/2008 | Murison et al. ............... 372/20 |
| 2003/0142392 | A1 * | 7/2003 | Strutz et al. .............. 359/337.2 |
| 2004/0052276 | A1 * | 3/2004 | Lou et al. ...................... 372/6 |
| 2004/0161250 | A1 * | 8/2004 | Kozlowski et al. .......... 398/204 |
| 2005/0036525 | A1 * | 2/2005 | Liu ................................ 372/6 |
| 2006/0262388 | A1 * | 11/2006 | Starodoumov et al. ... 359/341.1 |
| 2008/0181266 | A1 * | 7/2008 | Deladurantaye et al. ...... 372/25 |
| 2009/0147808 | A1 | 6/2009 | Murison et al. |

* cited by examiner

*Primary Examiner*—Minsun Harvey
*Assistant Examiner*—Phillip Nguyen
(74) *Attorney, Agent, or Firm*—Townsend and Townsend and Crew LLP

(57) ABSTRACT

A tunable pulsed laser source comprising a seed source adapted to generate a seed signal and an optical circulator. The optical circulator includes a first port coupled to the seed source, a second port, and a third port. The laser source also includes an amplitude modulator characterized by a first side and a second side. The first side is coupled to the second port of the optical circulator. The laser source further includes a first optical amplifier characterized by an input end and a reflective end including a spectral-domain reflectance filter. The input end is coupled to the second side of the amplitude modulator. Moreover, the laser source includes a second optical amplifier coupled to the third port of the optical circulator.

29 Claims, 5 Drawing Sheets

METHOD AND SYSTEM FOR TUNABLE PULSED LASER SOURCE

CROSS-REFERENCES TO RELATED APPLICATIONS

The present application is a continuation in part of U.S. patent application Ser. No. 11/737,052, filed on Apr. 18, 2007, and entitled "Method and System for Tunable Pulsed Laser Source," the disclosure of which is hereby incorporated by reference in its entirety.

BACKGROUND OF THE INVENTION

The present invention relates generally to the field of tunable laser sources. More particularly, the present invention relates to a method and apparatus for providing high power pulsed laser sources useful for industrial applications such as trimming, marking, cutting, and welding. Merely by way of example, the invention has been applied to a laser source generating an envelope of picosecond pulses in which the characteristics of the envelope (including width, peak power, repetition rate, and pulse shape) are tunable in real-time. However, the present invention has broader applicability and can be applied to other laser sources.

Pulsed laser sources, such as Nd:YAG lasers have been used to perform laser-based material processing for applications such as marking, engraving, micro-machining, and cutting. Depending on the application and the materials to be processed, the various characteristics of the laser pulses, including pulse width, pulse repetition rate, peak power or energy, and pulse shape, are selected as appropriate to the particular application. Many existing high power pulsed lasers, for example, have pulse energy greater than 0.5 mJ per pulse) rely on techniques such as Q-switching and mode locking to generate optical pulses. However, such lasers produce optical pulses with characteristics that are predetermined by the cavity geometry, the mirror reflectivities, and the like and cannot generally be varied in the field without compromising the laser performance. Using such lasers, it is generally difficult to achieve a range of variable pulse characteristics.

Thus, there is a need in the art for pulsed laser sources with tunable pulse characteristics.

SUMMARY OF THE INVENTION

According to the present invention, techniques related generally to the field of tunable laser sources are provided. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

According to an embodiment of the present invention, a tunable pulsed laser source is provided. The tunable pulse laser source includes a seed source adapted to generate a seed signal and an optical circulator. The optical circulator includes a first port coupled to the seed source, a second port, and a third port. The tunable pulse laser source also includes an amplitude modulator characterized by a first side and a second side. The first side is coupled to the second port of the optical circulator. The tunable pulse laser source further includes a first optical amplifier characterized by an input end and a reflective end including a spectral-domain reflectance filter. The input end is coupled to the second side of the amplitude modulator. Moreover, the tunable pulse laser source includes a second optical amplifier coupled to the third port of the optical circulator.

According to another embodiment of the present invention, a method of providing one or more laser pulses is provided. The method includes providing a seed signal at a first port of an optical circulator, transmitting the seed signal to the first side of an amplitude modulator, and transmitting the seed signal through the amplitude modulator to define a first pass through the amplitude modulator. The method also includes time-domain filtering the seed signal to provide a pulse. Time-domain filtering includes modulating a drive signal for the amplitude modulator. The method further includes amplifying the pulse using a first optical amplifier and frequency-domain filtering the amplified pulse to provide a spectrally filtered pulse. Additionally, the method includes transmitting the spectrally filtered pulse through the amplitude modulator to define a second pass through the amplitude modulator and time-domain filtering the amplified spectrally filtered pulse to provide an intermediate pulse. Time-domain filtering includes modulating the drive signal for the amplitude modulator. Moreover, the method includes amplifying the intermediate pulse using a second optical amplifier.

Numerous benefits are achieved using the present invention over conventional techniques. For example, in an embodiment according to the present invention, high power, pulsed lasers suitable for laser processing are provided that utilize a compact architecture that is inexpensive in comparison to lasers with comparable performance characteristics. Moreover, in embodiments of the present invention, short pulses are generated with pulse characteristics that are tunable in real-time while maintaining pulse-to-pulse stability. Furthermore, in an embodiment according to the present invention, optical pulses can be shaped to optimize the pulse profile for the particular application, or to maximize energy extraction efficiency in the laser system. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
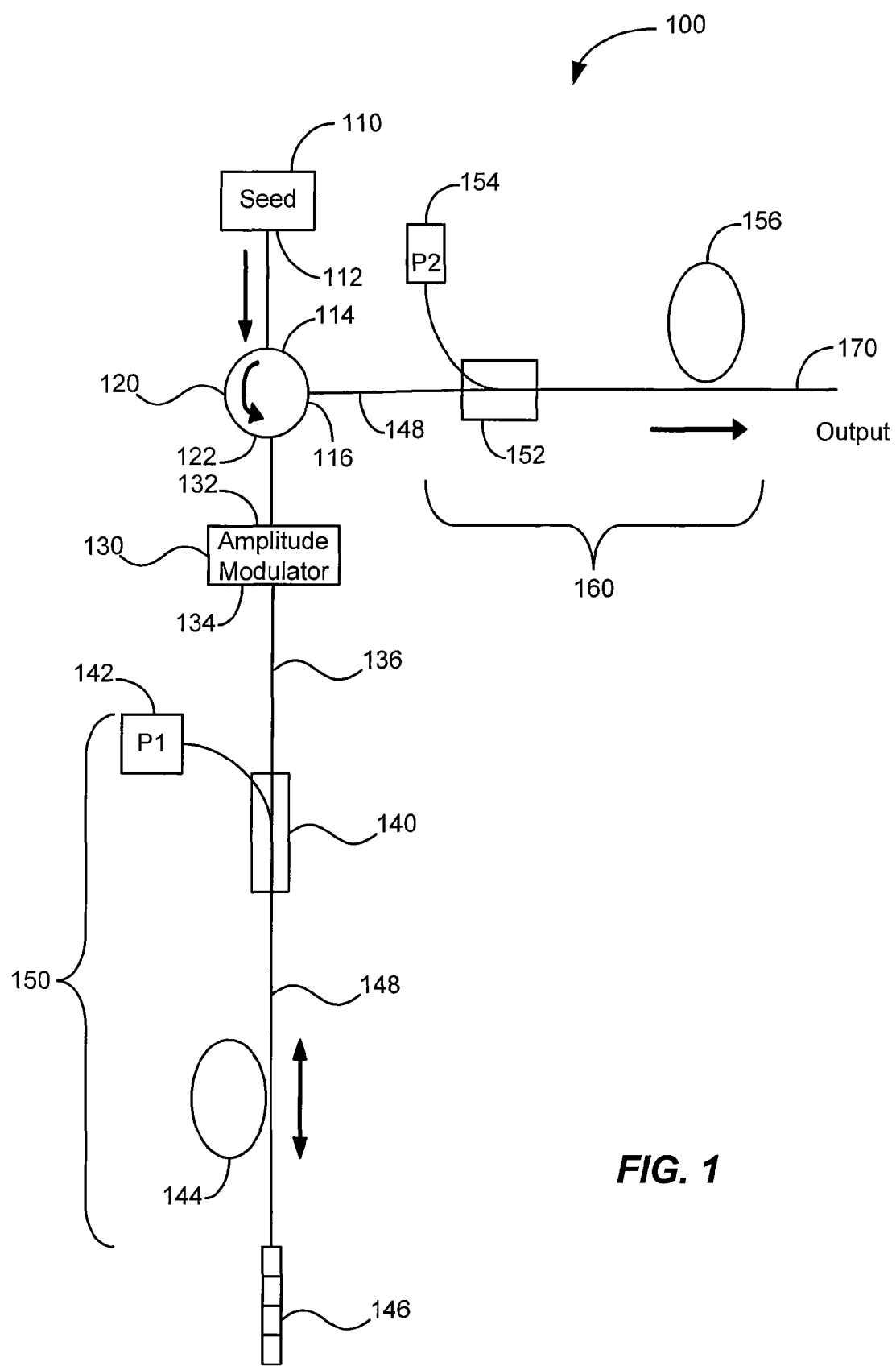
FIG. 1 is a simplified schematic illustration of a high power pulsed laser with tunable pulse characteristics using optical fiber amplifiers according to an embodiment of the present invention.

FIG. 1 is a simplified schematic illustration of a high power pulsed laser with tunable pulse characteristics using optical fiber amplifiers according to an embodiment of the present invention. High power pulsed laser 100 includes a seed source 110 that generates a seed signal that is injected into a first port 114 of an optical circulator 120. According to an embodiment of the present invention, the optical seed signal is generated by using a seed source 110 that is a continuous wave (CW) semiconductor laser.

According to another embodiment of the present invention, the optical seed signal is generated by using a seed source 110 that is an ultrafast laser such as a picosecond laser emitting pulses with a duration of from about one picosecond to some tens of picoseconds or a femtosecond laser emitting pulses with a duration of from about one femtosecond to some hundreds of femtoseconds. Thus, in some embodiments, the seed source 110 is a pulsed laser belonging to the category of ultrafast lasers or ultrashort pulse lasers. A variety of lasers can generate picosecond or femtosecond pulses, including actively or passively mode-locked solid-state bulk lasers, mode-locked fiber lasers, mode-locked laser diodes, or some Q-switched lasers. As described more fully throughout the present specification, the set or train of ultrafast pulses from the pulsed seed source will be modulated to form an envelope of pulses.

Exemplary ultrafast laser sources include picosecond, femtosecond, and other lasers that are configured to provide ultrafast optical pulses having pulse widths less than 1 ns in duration. The pulse duration or pulse width is typically defined as the duration at the half intensity points of the pulse, that is full width half maximum (FWHM). Such ultrafast laser sources include actively and passively mode-locked solid-state lasers, mode-locked fiber lasers, amplitude modulated CW sources including diode laser sources, solid-state laser sources, fiber laser sources, and the like. The ultrafast laser source could be a gain-switched diode laser, which can not only provide short pulses but also with different temporal spacing between pulses. These example laser systems are not intended to limit the scope of embodiments of the present invention, but to serve as examples of suitable lasers. Other laser systems that provide trains or a set of ultrafast laser pulses, including other types of picosecond and femtosecond lasers, are included within the scope of embodiments of the present invention.

In a particular embodiment, the picosecond seed source is a mode-locked fiber laser with wavelength 1064 nm which provides a train of short pulses of duration 10 ps at a repetition frequency of 200 MHz. In another particular embodiment, the picosecond seed source is a mode-locked neodymium vanadate solid state laser with wavelength 1064 nm which provides a train of short pulses of duration 20 ps at a repetition frequency of 1 GHz and an output power of 10 mW. The output power may be lower or greater than 10 mW. For example, the output power can be 2 mW, 20 mW, 100 mW, 250 mW, or the like. One of ordinary skill in the art would recognize many variations, modifications, and alternatives.

After passing through the optical circulator 120, the seed signal exits from a second port 122 of the circulator 120 and impinges on a first side 132 of an optical amplitude modulator 130. Circulators are well known in the art and are available from several suppliers, for example, model OC-3-1064-PM from OFR, Inc. of Caldwell, N.J.

The optical amplitude modulator 130 is normally held in an "off" state, in which the signal impinging on the modulator is not transmitted. According to embodiments of the present invention, optical amplitude modulator provides amplitude modulation and time-domain filtering of the seed signal as well as amplified spontaneous emission (ASE) filtering. In a particular embodiment, the length of the optical pulse is determined by the operation of the optical amplitude modulator 130, which may be an APE-type Lithium Niobate Mach-Zehnder modulator having a bandwidth >3 GHz at 1064 nm.

According to embodiments of the present invention, the optical amplitude modulator 130 is an electro-optic Mach-Zehnder type modulator, which provides the bandwidth necessary for generating short optical pulses. In other embodiments, the optical amplitude modulator 130 is a phase or frequency modulator with a suitable phase or frequency to amplitude converter, such as an edge optical filter, an extinction modulator, or an acousto-optic modulator. For example, an electro-optic phase modulator can induce a frequency chirp to the optical signal, which would be converted into an amplitude modulation when the optical signal is transmitted through a short or long pass optical filter. Preferably, the optical signal would be characterized by a wavelength that experiences high loss when no electrical signal is applied to the electro-optic phase modulator. When an electrical signal is applied to the electro-optic phase modulator, the optical signal preferably experiences a change in wavelength or frequency chirp to a value characterized by low optical loss.

In order to pass the seed signal, the optical amplitude modulator 130 is pulsed to the "on" state for a first time to generate an optical pulse along optical path 136. The pulse width and pulse shape of the optical pulse generated by the optical amplitude modulator 130 are controlled via by the modulator drive signal applied to the optical amplitude modulator 130. The optical pulse then passes for a first time through a first optical amplifier 150, where it is amplified. According to embodiments of the present invention, the amplitude modulator, driven by a time varying drive signal, provides time-domain filtering of the seed signal, thereby generating a laser pulse with predetermined pulse characteristics, including pulse width, pulse shape, and pulse repetition rate.

According to an embodiment of the present invention, the optical amplifier 150 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing optical amplifier 150 utilize polarization-maintaining single-mode fiber.

Referring to FIG. 1, in embodiments utilizing fiber amplifiers, a pump 142 is coupled to a rare-earth-doped fiber loop 144 through optical coupler 140. Generally, a semiconductor pump laser is used as pump 142. One of ordinary skill in the art would recognize many variations, modifications, and alternatives. In alternative embodiments, the optical amplifier 150 is a solid-state amplifier including, but not limited to, a solid-state rod amplifier, a solid-state disk amplifier or gaseous gain media.

In a particular embodiment, the optical amplifier 150 includes a 5 meter length of rare-earth doped fiber 144, having a core diameter of approximately 4.1 µm, and doped with Ytterbium to a doping density of approximately $4 \times 10^{24}$ ions/m$^3$. The amplifier 150 also includes a pump 142, which is an FBG-stabilized semiconductor laser diode operating at a wavelength of 976 nm, and having an output power of 100 mW. The output power can be lower or greater than 100 mW. For example, it can be 50 mW, 150 mW, 200 mW, 250 mW, 300 mW, 350 mW, 400 mW, or the like. In another particular embodiment, the pump 142 is a semiconductor laser diode operating at a wavelength of about 915 nm. In yet another particular embodiment, the pump 142 is a semiconductor laser diode operating at an output power of 450 mW or more. In a specific embodiment, the amplifier 150 also includes a pump to fiber coupler 140, which is a WDM pump combiner.

The signal emerging from optical amplifier 150 along optical path 148 then impinges on a reflecting structure 146, and is reflected back into optical amplifier 150. The signal passes for a second time through optical amplifier 150, wherein the signal is amplified. The reflecting structure 146 performs spectral domain filtering of the laser pulse and of the amplified spontaneous emission (ASE) propagating past optical path 148. Thus, the seed signal experiences both amplitude and time-domain modulation passing through amplitude modulator 130, and spectral-domain filtering upon reflection from reflecting structure 146.

In an embodiment, the reflecting structure 146 is a fiber Bragg grating (FBG) that is written directly in the fiber used as the optical amplifier 150. The periodicity and grating characteristics of the FBG are selected to provide desired reflectance coefficients as is well known in the art. Merely by way of example in a particular embodiment, the reflecting structure 146 is a FBG having a peak reflectance greater than 90%, and a center wavelength and spectral width closely matched to the output of the seed source 110.

The signal emerging from optical amplifier 150 along optical path 136 impinges on the second side 134 of the optical amplitude modulator 130, which is then pulsed to the "on" state a second time to allow the incident pulse to pass through. According to embodiments of the present invention, the timing of the second "on" pulse of the optical amplitude modulator 130 is synchronized with the first opening of the modulator 130 (first "on" pulse) to take account of the transit time of the signal through the amplifier 150 and the reflecting structure 146. After emerging from the first side of the optical amplitude modulator 130, the amplified pulse then enters the second port 122 of optical circulator 120, and exits from the third port 116 of optical circulator 120 along optical path 148.

The signal is then amplified as it passes through a second optical amplifier 160. As discussed in relation to FIG. 1, embodiments of the present invention utilize a fiber amplifier as optical amplifier 160, including a pump 154 that is coupled to a rare-earth-doped fiber loop 156 through an optical coupler 152. Generally, a semiconductor pump laser is used as pump 154, although pumping of optical amplifiers can be achieved by other means as will be evident to one of skill in the art. In a particular embodiment, the second optical amplifier 160 includes a 5 meter length of rare-earth doped fiber 156, having a core diameter of approximately 4.8 µm, and is doped with Ytterbium to a doping density of approximately $6 \times 10^{24}$ ions/m$^3$. The amplifier 160 also includes a pump 154, which is an FBG-stabilized semiconductor laser diode operating at a wavelength of 976 nm, and having an output power of 500 mW. In another particular embodiment, the second optical amplifier 160 includes a 2 meter length of rare-earth doped fiber 156, having a core diameter of approximately 10 µm, and is doped with Ytterbium to a doping density of approximately $1 \times 10^{26}$ ions/m$^3$. The fiber length can be shorter or longer than 2 meters. For example, it can be 1.0 m, 3.0 m, 3.5 m, 4.0 m, 4.5 m, 5.0 m, or the like. The amplifier 160 can also include a multimode pump 154, which is a semiconductor laser diode having an output power of 5 W. The output power can be lower or greater than 5 W. For example, it can be 3 W, 4 W, 6 W, 7 W, 8 W, 9 W, 10 W, or the like.

In another particular embodiment, in order to pass the seed signal, the optical amplitude modulator 130 is pulsed once instead of twice. The optical amplitude modulator 130 is turned to the "on" state to generate the rising edge of the pulse propagating along optical path 136. This signal is then amplified a first time through optical amplifier 150. The signal then impinges on the reflecting structure 146 and is amplified a second time through optical amplifier 150. Now the signal emerging from optical amplifier 150 along optical path 136 impinges on the second side 134 of the optical amplitude modulator 130, which is subsequently turned to the "off" state. The pulse width is therefore given by the time duration during which the optical amplitude modulator 130 is held in the "on" state subtracted by the transit time of the signal through the amplifier 150 and the reflecting structure 146.

Although FIG. 1 illustrates the use of a single optical amplifier 160 coupled to the third port of the optical circulator 120, this is not required by the present invention. In alternative embodiments, multiple optical amplifiers are utilized downstream of the optical circulator 120 as appropriate to the particular applications. One of ordinary skill in the art would recognize many variations, modifications, and alternatives.

Figure 2:
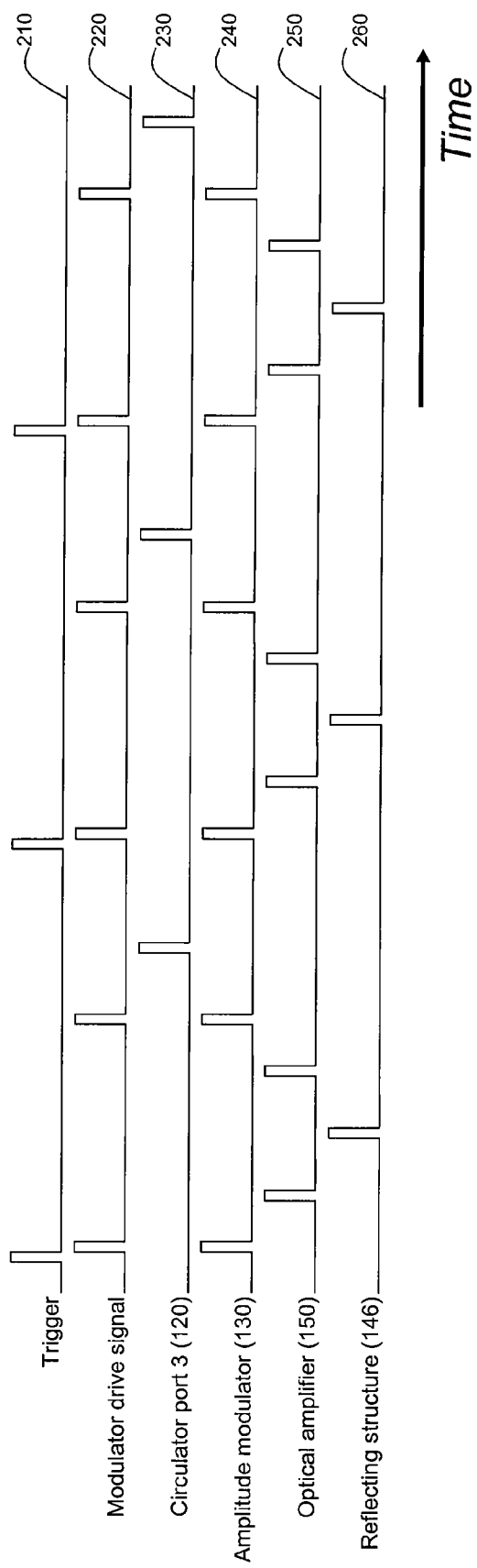
FIG. 2 is a simplified timing diagram illustrating electrical and optical pulses at different locations in a high power pulsed laser according to an embodiment of the present invention.

FIG. 2 is a simplified timing diagram illustrating electrical and optical pulses at different locations in a high power pulsed laser according to an embodiment of the present invention. Merely by way of example, FIG. 2 illustrates the timing of repetitive electrical drive signals to the amplitude modulator and optical pulses propagating through an embodiment of the invention as described in FIG. 1. Following an electrical trigger 210, a first electrical drive signal 220 is applied to the amplitude modulator to generate an optical pulse 240. After some propagation delay, the optical signal 250 passes through the optical amplifier a first time. The optical signal 260 then impinges on the reflecting structure and passes through the optical amplifier a second time 250. The optical pulses 240 are transmitted through the amplitude modulator a second time, which is driven electrically a second time 220 with the optical pulses 240. Finally the optical pulses 230 exit port 3 of the circulator after some propagation delay.

Figure 4A:
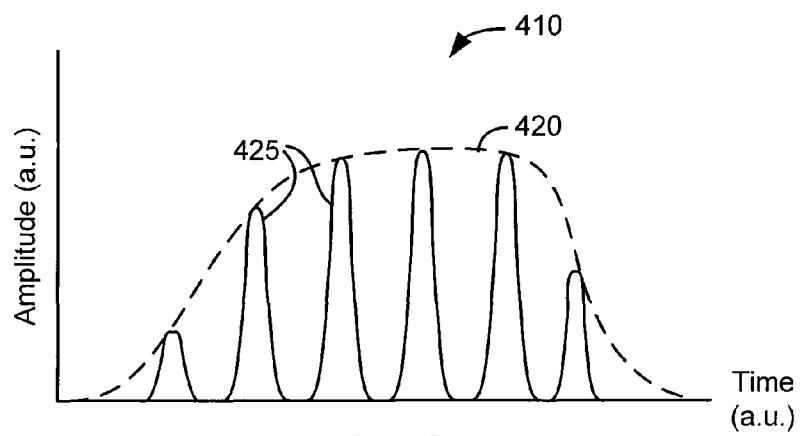
FIG. 4A illustrates an intermediate optical pulse according to an embodiment of the present invention.

In embodiments of the present invention utilizing a picosecond, femtosecond, or other ultrafast laser as the seed source, the optical pulses illustrated as continuous pulsed waveforms in FIG. 2 will actually be modulated envelopes, each of the modulated envelopes including a number of picosecond or femtosecond pulses. FIG. 4A illustrates an optical pulse along optical path 136 according to an embodiment of the present invention. As illustrated in FIG. 4A, the optical pulse 410 is shown exiting the amplitude modulator prior to amplification by the optical amplifier 150. The optical pulse 410 includes envelope 420, which modulates the amplitude of the various ultrashort pulses 425 generated using the ultrafast seed source 110. In a particular embodiment, the width of the pulses 425 is on the order of 20 ps and the full width at half maximum (FWHM) of the envelope 420 is on the order of about 10 ns. In another particular embodiment, the pulse width is on the order of 50 ps. In other embodiments, the pulse width ranges from about femtoseconds to about hundreds of picoseconds and the FWHM ranges from about 1 ns to about 100 ns. Although FIG. 4A illustrates a single envelope 420, it will be appreciated that embodiments of the present invention provide for a series of envelopes as illustrated in FIG. 2, with each of the envelopes including one or more ultrafast pulses, e.g., picosecond pulses.

Although the optical pulse 410 illustrates six picosecond pulses 425 under the envelope 420, this is not required by embodiments of the present invention. In some applications, the number of pulses under the envelope (i.e., one or more), the delay between pulses, and the duration of the pulses is varied depending on the particular application. Additionally, although the rise time and fall time of the optical pulse 410 are illustrated as approximately the same, this also is not required by the present invention. In some applications, the rise time is longer than the fall time, the rise time is shorter than the fall time, or the like. The operation of the amplitude modulator 130, along with other operating parameters, will determine the shape of the optical pulse, which is generally a predetermined shape appropriate to the particular applications for which the laser is utilized. One of ordinary skill in the art would recognize many variations, modifications, and alternatives.

Figure 4B:
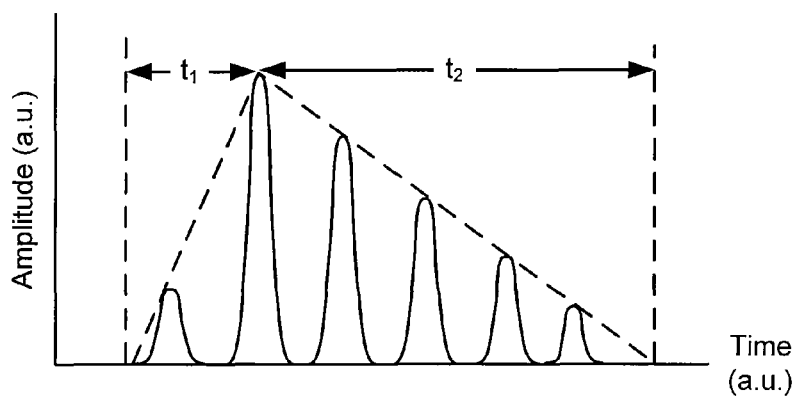
FIG. 4B illustrates an optical output pulse provided according to an embodiment of the present invention.

FIG. 4B illustrates an optical output pulse provided according to an embodiment of the present invention. The optical output pulse 450 illustrated in FIG. 4B is representative of an output pulse at optical path 170. As an output pulse, the envelope 460 is determined, in part, by the amplitude modulator 130. Thus, in the exemplary embodiment illustrated in FIG. 4B, the amplitude modulator has been driven to provide a generally rapid rise time $t_1$ for the first portion of the output pulse and a relatively slow fall time $t_2$ for the second portion of the output pulse. The particular shape of the output pulse, for example, a longer rise time than fall time, equal rise and fall times, and the like, will depend on the particular application. Additionally, although FIG. 4B illustrates a single pulse, some embodiments of the present invention provide for multiple envelope pulses, each of the individual envelopes including a number of picosecond or other short duration pulses. Thus, in some embodiments, the first pulse amplitude may be less than a later pulse amplitude to provide a series of low amplitude picosecond pulses in a first train followed by a series of high amplitude picosecond pulses in a second train.

Figure 4C:
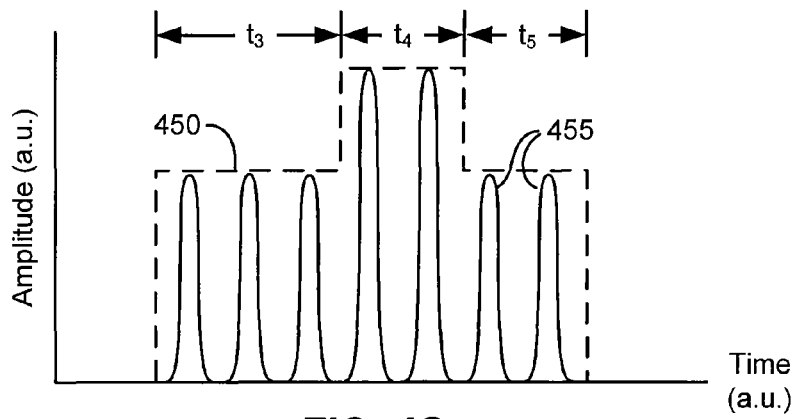
FIG. 4C illustrates an optical output pulse provided according to another embodiment of the present invention.

FIG. 4C illustrates an optical output pulse provided according to another embodiment of the present invention. As illustrated in FIG. 4C, the envelope 450 is characterized by a square pulse shape with shoulders. Thus, the first portion of the envelope (time $t_3$) and the third portion of the envelope (time $t_5$) are of substantially the same amplitude, with the second portion or central portion of the envelope (time $t_4$) being of a larger amplitude. Of course, in other embodiments, the amplitudes of the various portions may be larger or smaller as appropriate to the particular application. Additionally, the number and duration of the portions (e.g., $t_3$-$t_5$) as well as the number of picosecond pulses 455 under each portion of the envelope 450 will vary depending on the picosecond pulse width, the delay between picosecond pulses, and the duration of the particular portion. One of ordinary skill in the art would recognize many variations, modifications, and alternatives.

The use of the ultrafast laser seed source provides an envelope of pulses that may be particularly suitable for non-thermal processing, as well as other types of laser processing. Picosecond laser pulses can provide non-thermal processing for a variety of industrial machining applications because the short pulses, with their high peak power density, ablate material from the workpiece before thermal diffusion results, along with the undesirable side effects associated with thermal diffusion. Utilizing a specific embodiment of the present invention, the envelope of picosecond laser pulses is focused onto the workpiece and used to remove a material layer on the order of 10 nm utilizing a basically non-thermal process. In some applications, the use of a non-thermal process reduces the formation of micro-cracks, burrs, or the like. Such processing may be referred to as a cold ablation process. Industrial applications for modulated trains of picosecond pulses include drilling small apertures or structures (for electrical, biomedical, fluidic devices, or the like). Materials suitable for processing using laser systems provided by embodiments of the present invention include glass materials that would otherwise crack or be damaged using thermal processing regimes. Other materials which benefit from the use of ultrashort pulses in laser processing include plastics, insulators, coatings, thin films, ceramics, semiconductors, biological materials, and metals such as gold.

In various embodiments of the present invention, tunable pulsed laser sources are characterized by one or more operating parameters. In embodiments of the present invention, the wavelength of the tunable pulsed laser source ranges from the UV to the infrared. As an example, the wavelength of the tunable pulsed laser source can be one of several wavelengths. Exemplary wavelengths include, for example, 1064 nm, 1310 nm, 1550 nm, 1800 nm, harmonics associated with these wavelengths, and the like. Thus, many different tunable pulsed laser sources are included within the scope of embodiments of the present invention. The repetition frequency of the ultrafast pulse is generally provided in reference to the width of the envelope generated by the tunable pulsed laser system described herein. Thus, in some embodiments, there are one or more ultrafast pulses included within each envelope, for example, a plurality of pulses as illustrated in FIGS. 4A-4C.

In one such embodiment, the energy per pulse at wavelength 1064 nm is 0.5 µJ for a pulse length of 20 ps and a repetition frequency of 1 GHz. An envelope of duration 10 ns contains 10 short pulses, the envelope energy is 5 µJ and the laser average power at a pulse rate of 500,000 pulses per second is 2.5 watts. Alternately, by adjusting tunable pulsed laser parameters, an envelope of duration 1 ns which contains only 1 short pulse is obtained, the envelope energy is 0.5 µJ and the laser average power at a pulse rate of 500,000 pulses per second is 0.25 watts. Alternately, by adjusting tunable pulsed laser parameters, an envelope of duration 100 ns which contains 100 short pulses is obtained, the envelope energy is 50 µJ and the laser average power at a pulse rate of 50,000 pulses per second is 2.5 watts. Depending on the seed source chosen, the pulse energy for the ultrafast pulse can range from 0.01 µJ to 50 µJ for ultrafast pulse durations ranging from 10 fs to 200 ps and for repetition frequencies ranging from 20 MHz to 20 GHz. The number of ultrashort pulses contained in each envelope can range from 1 to 500 with an envelope pulse energy in the range of 0.01 µJ to 250 µJ.

Short wavelengths sometimes have beneficial properties for processing of some materials. As an example, ultraviolet wavelengths are often used to process materials such as semiconductors, plastics, thin films, coatings, and biological materials. Such wavelengths are obtained in embodiments of the present invention by the use of harmonic wavelength generation techniques such as harmonic doubling, harmonic tripling, harmonic quadrupling, and harmonic mixing in nonlinear crystals such as lithium borate LBO, beta barium borate BBO, and the like. In an embodiment of the present invention, a suitable harmonic converter is incorporated at position 170 as illustrated in FIG. 1. Such frequency conversion techniques are well known in the art. In such cases, energy conversion efficiencies typically fall between 10% and 80%. As an example, by the use of harmonic doubling in the nonlinear crystal LBO in an embodiment of the present invention, the ultrashort pulse energy is 0.4 µJ with a ultrafast pulse duration of 20 ps, there are 10 such ultrafast pulses contained in an envelope of duration 10 ns, the envelope energy is 4 µJ and the laser average power at a wavelength of 532 nm and envelope pulse rate of 500,000 pulses per second is 2 W. As another example, by the use of harmonic mixing in LBO crystals in an embodiment of the present invention, the ultrafast pulse energy is 0.2 µJ with a ultrafast pulse duration of 20 ps, there are 10 such ultrafast pulses contained in an envelope of duration 10 ns, the envelope energy is 2 µJ and the laser average power at a wavelength of 355 nm and envelope pulse rate 500,000 pulses per second is 1 W. One of ordinary skill in the art would recognize many variations, modifications, and alternatives.

Figure 3:
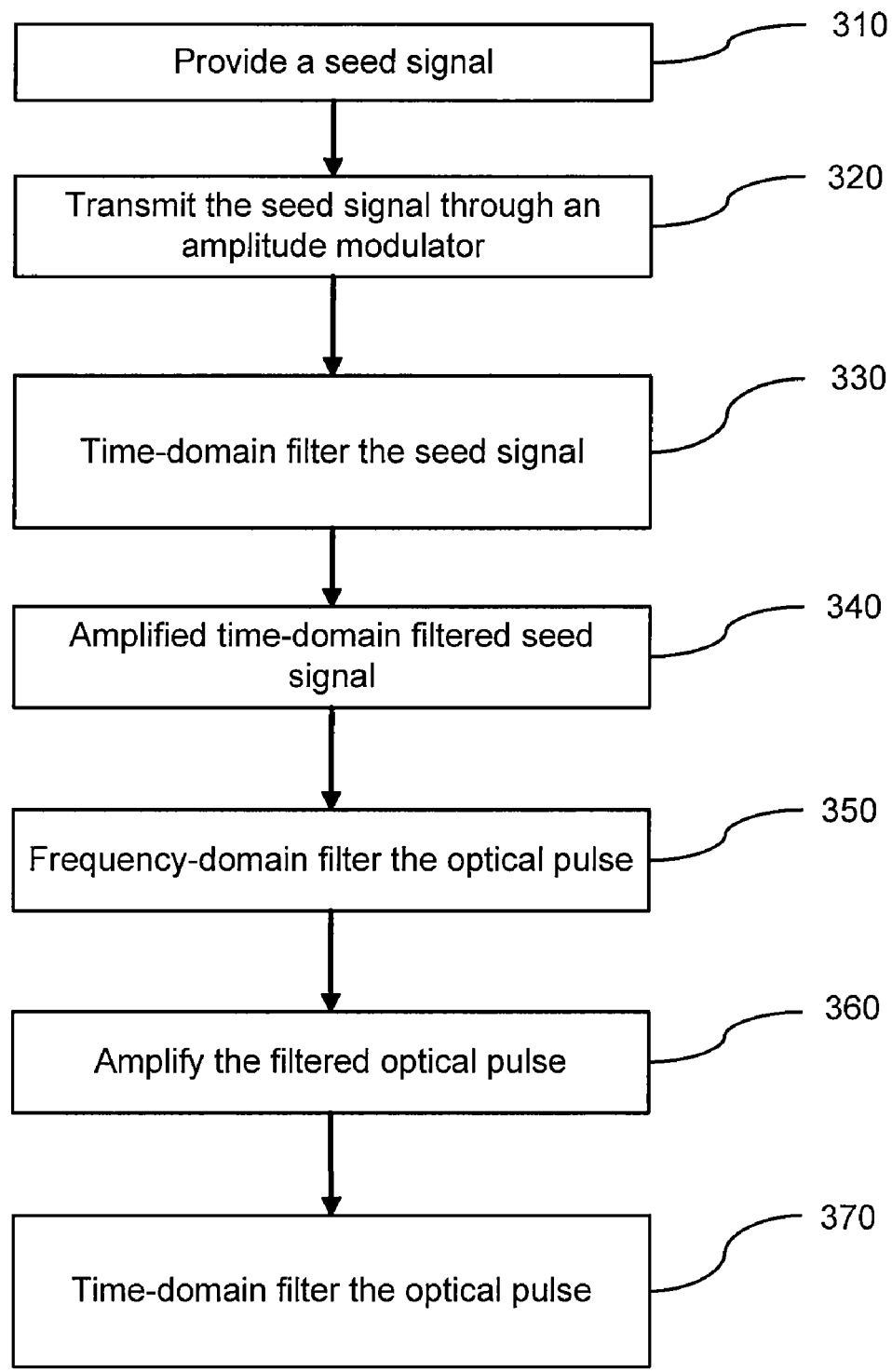
FIG. 3 is a simplified illustration of a method of providing a series of laser pulses according to an embodiment of the present invention.

FIG. 3 is a simplified illustration of a method of providing a series of laser pulses according to an embodiment of the present invention. The method includes providing a seed signal (310). In embodiments of the present invention, the seed signal can be generated by a semiconductor laser at a wavelength of 1064 nm. The method also includes the transmission of the seed signal through an amplitude modulator (320) for a first time. In embodiments of the present invention, the coupling of the seed signal into the amplitude modulator can be facilitated by an optical circulator or other means of optical coupling. The method further provides for time-domain filtering of the seed signal by applying a drive signal to the amplitude modulator a first time (330). The pulse is amplified by the optical amplifier (340) and frequency-domain filtered (350). Thus, a spectrally filtered pulse is provided at one stage of the system illustrated in FIG. 3.

It will be appreciated that several combinations of amplifiers and frequency-domain filtering architectures can be utilized without departing from the scope of the embodiments described herein. For example, the frequency-domain filtering can be achieved before or after amplification of the pulse. Additionally, frequency-domain filtering can be achieved after a first amplification of the pulse and before a second amplification of the pulse as would happen in a double-pass optical amplifier. Moreover, the method includes transmitting the optical signal a second time through the amplitude modulator (360) and providing time-domain filtering of the pulsed signal by applying a drive signal to the amplitude modulator a second time (370). After passing through the amplitude modulator a second time, the amplified spectrally and temporally filtered pulse may be referred to as an intermediate pulse. In embodiments of the present invention, the optical pulse is generated by modulating the seed signal during a first-pass transmission through the amplitude modulator and is then gated during a second-pass transmission through the amplitude modulator.

Utilizing embodiments of the present invention, high power pulsed laser sources are provided that generate streams of optical pulses with independently adjustable pulse characteristics including pulse width, peak power and energy, pulse shape, wavelength, and pulse repetition rate. Merely by way of example, a particular embodiment of the present invention delivers output pulse envelopes at the output 170 of second optical amplifier 160 of more than 5 µJ per pulse envelope at a pulse envelope width of 10 ns and at a pulse rate of 10 kHz. Of course, other pulse envelope characteristics are provided by alternative embodiments. For example, the pulse envelope energy can be 0.1 µJ, 1 µJ, 10 µJ, 30 µJ, or the like. The pulse envelope duration is in a range of values, for example, between 1 ns and 150 ns. The pulse envelope pulse rate is in a range of values, for example, 0 to 500 kHz.

In some of the embodiments described above, a CW seed source is utilized and time-domain filtering to provide a laser pulse is performed using the amplitude modulator 120. However, this is not required by the present invention. In an alternative embodiment, the seed signal is modulated to provide a pulsed seed signal rather than CW seed signal. Providing a pulsed seed signal minimizes parasitic signal build-up caused by seed leakage and enables the operating power range of the seed source to be increased. For example, the pulse seed output power can be 200 mW, 500 mW, or even 1 W. In this alternative embodiment, the pulsed seed signal may be of a pulse width equal to, or longer than the desired pulse width of overall pulsed laser source. Pulsing the seed can also increase the effective linewidth of the seed laser to reduce Stimulated Brillouin Scattering (SBS). Thus, although some embodiments of the present invention utilize a picosecond or other ultrafast laser source, pulsed laser sources providing longer pulses (nanosecond, microsecond, or the like) are included within the scope of embodiments of the present invention.

According to embodiments of the present invention, methods and systems are provided that result in the generation of sequences of optical pulses, which may not be equally separated in time. Moreover, the pulse widths and pulse energies are individually tailored in a predetermined manner from pulse to pulse. Furthermore, it will be recognized that although the above description discussed the generation of a single optical pulse, embodiments of the present invention provide for the generation of multiple pulses by repeating the single pulse a multiplicity of times. These multiple pulses may include an arbitrary train of optical pulse sequences.

Figure 5:
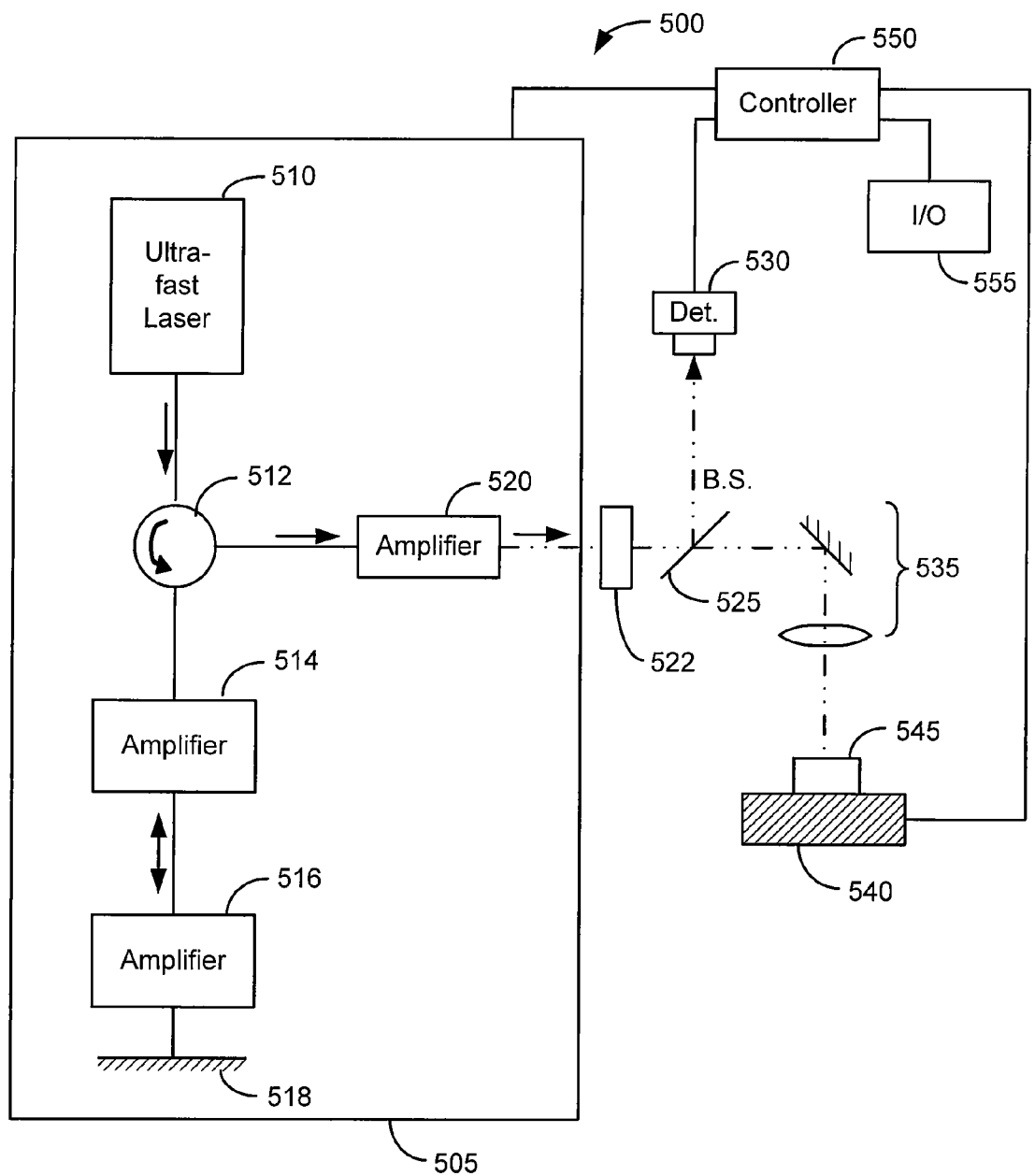
FIG. 5 is a simplified schematic diagram of a laser processing system according to an embodiment of the present invention.

FIG. 5 is a simplified schematic diagram of a laser processing system according to an embodiment of the present invention. As illustrated in FIG. 5, the laser processing system 500 includes an optical source 505. The optical source 505 includes an ultrafast laser source 510 (e.g., a picosecond laser source, a femtosecond laser source, or the like). The ultrafast laser source provides a series, set, or train of optical pulses to optical circulator 512. In the embodiment illustrated in FIG. 5, the optical circulator 512 is a three port optical circulator, but other optical circulators, including four port optical circulators are included within the scope of the present invention. The signal passing through the optical circulator passes to amplitude modulator 514, through the first amplifier 516, and to reflector 518. As described more fully throughout the present specification, the amplitude modulator may be a Mach-Zehnder modulator, the first amplifier may be a fiber amplifier, and the reflector may be a spectral filter such as a FBG. After passing through the first amplifier and the amplitude modulator during a second pass, the signal is output at the third port of the optical circulator and passes through a second amplifier 520, providing an output as illustrated. The output of the optical source 505 is a series, set, or train of optical pulses modulated by a pulse envelope as described more fully throughout the present specification. The output of the optical source 505 may be in the form of one or more pulse envelopes, each pulse envelope including a plurality of ultrashort (e.g., picosecond) pulses.

The laser processing system 500 also includes a beam splitter 525, and detector 530. In some embodiments, the detector is configured to detect characteristics associated with the envelope (e.g., amplitude, pulse width, or the like), characteristics associated with the train of picosecond pulses (e.g. pulse widths, phase, combinations thereof, or the like). The laser processing system optionally includes a harmonic generator 522 in order to provide short wavelengths suitable for processing of some materials. The harmonic generator 522 may utilize harmonic doubling, harmonic tripling, harmonic quadrupling, or harmonic mixing using a variety of nonlinear crystals. In some embodiments of the present invention in which longer wavelengths are suitable for processing the desired material, the harmonic generator may be bypassed or removed.

Although these optical elements are illustrated for monitoring the laser output provided by laser source 505, other suitable optical components are included within the scope of the present invention. Additional optical elements 535 (e.g., a turning mirror and a lens) are utilized to focus the laser output onto a workpiece 545, which is supported on workpiece support 540, which may provide for multi-dimensional motion and actuation. The optical elements 535 are merely representative of optics that would be utilized in a system and are not intended to limit the scope of the present invention. The workpiece 545, which may be a variety of materials, is processed by the laser output to form one or more desired structures or features. The laser processing system 500 does not generally include the workpiece 545, but a workpiece is illustrated in FIG. 5 for purposes of clarity.

The laser processing system 500 also includes a controller 550 that is in electrical and/or optical communication with the laser source 505, the detector 530, workpiece support 540, and input/output device 555. In other embodiments, the controller 550 may be in communication with one or more sensors, detectors, imagers, motion stages, or the like associated with the workpiece and/or the workpiece support 540. Thus, control of the position, orientation, and other characteristics of the workpiece are provided via controller 550. In yet other embodiments, the controller 550 may be in communication with adjustable mirrors which are used to redirect the output beam to different positions on the workpiece. As an example, such mirrors may be mounted upon rotatable galvanometers which can be controlled using controller 550.

Exemplary materials suitable for processing by the laser processing system include metals and metal alloys, semiconductors, ceramics, glass materials, minerals, plastics, synthetic materials, and the like. Processes including machining thermally sensitive layers, fabrication or repair of lithographic masks, structuring solar cells, scribing patterns in coatings and thin layers, cutting surfaces of tools, semiconductor circuit repair, and the like.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A tunable pulsed laser source comprising:
a ultrafast laser source configured to provide a seed signal, wherein the seed signal comprises a train of pulses;
an optical circulator including a first port coupled to the ultrafast laser source, a second port, and a third port;
an amplitude modulator characterized by a first side and a second side, wherein the first side is coupled to the second port of the optical circulator;
a first optical amplifier characterized by an input end and a reflective end, wherein the input end is coupled to the second side of the amplitude modulator; and
a second optical amplifier coupled to the third port of the optical circulator.

2. The tunable pulsed laser source of claim 1 wherein the ultrafast laser source comprises at least one of a picosecond or femtosecond laser source.

3. The tunable pulsed laser source of claim 1 wherein the ultrafast laser source comprises a mode-locked solid-state laser.

4. The tunable pulsed laser source of claim 3 wherein the solid-state mode-locked laser is actively locked.

5. The tunable pulsed laser source of claim 1 wherein the ultrafast laser source comprises a fiber laser.

6. The tunable pulsed laser source of claim 1 wherein the ultrafast laser source comprises a gain-switched diode laser.

7. The tunable pulsed laser source of claim 1 wherein each of the train of pulses are characterized by a pulse width less than 1 ns.

8. The tunable pulsed laser source of claim 1 wherein the amplitude modulator comprises a Mach-Zehnder interferometric amplitude modulator adapted to perform time-domain transmission filtering of the seed signal.

9. The tunable pulsed laser source of claim 1 wherein the first optical amplifier comprises a rare-earth doped optical fiber amplifier.

10. The tunable pulsed laser source of claim 9 wherein rare-earth doping in the rare-earth doped optical fiber comprises a mixture of one or more rare-earth elements.

11. The tunable pulsed laser source of claim 9 wherein the rare-earth doped optical fiber amplifier comprises at least one of a single-clad, double-clad, or multiple-clad fiber design.

12. The tunable pulsed laser source of claim 1 wherein the second optical amplifier comprises a second rare-earth doped optical fiber amplifier.

13. The tunable pulsed laser source of claim 1 wherein the reflective end comprises a Fiber Bragg Grating (FBG).

14. The tunable pulsed laser source of claim 13 wherein a reflectance spectrum of the spectral-domain reflectance filter is substantially matched to an output spectrum of the ultrafast laser source.

15. A method of providing a pulse envelope including a plurality of picosecond pulses, the method comprising:
providing a set of picosecond pulses at a first port of an optical circulator;
transmitting the set of picosecond pulses to the first side of an amplitude modulator;
transmitting the set of picosecond pulses through the amplitude modulator to define a first pass through the amplitude modulator;
time-domain filtering the set of picosecond pulses to provide a pulse envelope, wherein time-domain filtering comprises modulating a drive signal for the amplitude modulator;
amplifying the pulse envelope using a first optical amplifier;
frequency-domain filtering the amplified pulse envelope to provide a spectrally filtered pulse envelope;
transmitting the spectrally filtered pulse envelope through the amplitude modulator to define a second pass through the amplitude modulator;
time-domain filtering the amplified spectrally filtered pulse envelope to provide an intermediate pulse envelope, wherein time-domain filtering comprises modulating the drive signal for the amplitude modulator; and
amplifying the intermediate pulse envelope using a second optical amplifier.

16. The method of claim 15 wherein the set of picosecond pulses is provided by a mode-locked solid-state laser.

17. The method of claim 15 wherein the set of picosecond pulses is provided by a mode-locked fiber laser.

18. The method of claim 15 wherein the amplitude modulator comprises a Mach-Zehnder interferometric amplitude modulator.

19. The method of claim 15 wherein the first optical amplifier comprises a double-pass optical fiber amplifier.

20. The method of claim 15 wherein frequency-domain filtering the amplified pulse envelope comprises using a spectral-domain reflectance filter including a Fiber Bragg Grating (FBG).

21. The method of claim 15 wherein the second optical amplifier comprises a single-pass optical fiber amplifier.

22. A laser processing system for processing a workpiece, the laser processing system comprising:
a laser source comprising:
an ultrafast laser configured to provide a train of pulses, each of the pulses being characterized by a pulse width of less than 1 ns;
an optical circulator including a first port in optical communication with the picosecond laser source, a second port, and a third port;
an amplitude modulator characterized by a first side and a second side, wherein the first side is in optical communication with the second port of the optical circulator;
a double-pass optical amplifier in optical communication with the second side of the amplitude modulator; and
a second optical amplifier in optical communication with the third port of the optical circulator, wherein an output of the second optical amplifier is configured to provide an envelope of laser pulses;
a workpiece support configured to support the workpiece;
an optical system configured to direct the envelope of laser pulses to the workpiece; and
a controller coupled to the laser source and the workpiece support.

23. The laser processing system of claim 22 wherein the ultrafast laser comprises at least one of a picosecond or femtosecond laser.

24. The laser processing system of claim 22 wherein the ultrafast laser source comprises a mode-locked laser.

25. The laser processing system of claim 22 wherein the ultrafast laser source comprises a gain-switched diode laser.

26. The laser processing system of claim 22 wherein the double-pass optical amplifier comprises a rare-earth doped optical fiber amplifier.

27. The laser processing system of claim 22 further comprising a Fiber Bragg Grating in optical communication with the double-pass optical amplifier.

28. The laser processing system of claim 22 further comprising an optical coupler between the controller and the optical system.

29. The laser processing system of claim 22 further comprising a harmonic converter optically coupled to the laser source.

* * * * *